United States Patent [19]

Sher

[11] Patent Number: 5,470,234

[45] Date of Patent: Nov. 28, 1995

[54] CIRCULAR, PIECE-MATCHING MATH EDUCATIONAL AID

[76] Inventor: Louis Y. Sher, 504 Copper Ridge Dr., Richardson, Tex. 75080

[21] Appl. No.: 261,333

[22] Filed: Jun. 16, 1994

[30] Foreign Application Priority Data

Jun. 16, 1993 [TW] Taiwan .................................. 82208343

[51] Int. Cl.[6] ..................................................... G09B 1/02
[52] U.S. Cl. ........................................ 434/196; 434/214
[58] Field of Search ................................. 434/196, 195, 434/191, 188, 206, 214

[56] References Cited

U.S. PATENT DOCUMENTS

| | | | |
|---|---|---|---|
| 342,651 | 5/1886 | Southworth | 434/196 |
| 1,132,272 | 3/1915 | Jacobs | 434/191 X |
| 3,866,919 | 2/1975 | Powell | 434/196 X |
| 3,996,675 | 12/1976 | Placek | 434/196 |

Primary Examiner—Gene Mancene
Assistant Examiner—Jeffrey A. Smith
Attorney, Agent, or Firm—Timmons & Kelly

[57] ABSTRACT

A design for a circular, piece-matching math educational aid is disclosed. It contains a holding plate and various fraction pieces. The circular holding plate has a clockwise spiral bottom, designed in such a way that a sloped cliff is formed at the joint of the starting and ending point. The edge of the cliff is lined up with a guiding mark "0" on a fraction scale marked on an elevated wall on the outer circumference of the holding plate. The fraction pieces contain numerous pie-shaped segments. Any of the segments can precisely depict a fraction, based on the ratio of its center angle to the circle, 360 degrees. The pieces can be made with any center angles, such as 5, 7.5, 10, 30, 45, 60, 90, 180 degrees, etc.

5 Claims, 3 Drawing Sheets

5,470,234

CIRCULAR, PIECE-MATCHING MATH EDUCATIONAL AID

BACKGROUND OF THE INVENTION

1. Field of the Invention

The present invention relates to a math educational aid and, in particular, a circular fraction teaching and learning aid.

2. Description of Related Art

One currently available fraction learning aid is composed of a flat-bottom plate and a single piece of pie-shaped guiding segment. The user has to move the guiding piece and manually mark on the fraction scale for each fraction to be worked on. As a result, the manual marking process not only reduces the accuracy but also causes confusion in learning. In addition, the design has two major faults:

1. the flat bottom limits the maximum of the fractions to 1, i.e. 360 degrees of a circle.
2. a single piece for manual marking is too cumbersome for the user. Since the user has to move the piece to a new position for each fraction involved, the guide lines change each time. It relies entirely on the user to accurately move the guiding piece and mark on the scale, which is very time consuming, not to mention the total accuracy is difficult to achieve.

SUMMARY OF THE INVENTION

This invention is to improve the current available fraction learning aid. It contains a holding plate and various pie-shaped fraction pieces. The fraction pieces are not used for any guiding purpose, but to precisely depict a fraction. With the combination of any number of the pieces, the final result of the fractions can be very easily identified on the fraction scale. No manual marking is involved in the whole procedure.

The bottom of the holding plate is designed into a clockwise spiral shape with a sloped cliff formed at the joint of the starting and ending point. The edge of the cliff is lined up with the engraved guiding mark "0" on the fraction scale, which is the starting point for any math operations of fractions. The spiral design makes it possible for the fraction pieces to overlap and thus the final result of the fractions may go well over 1, 2 or more.

The various fraction pieces make it very simple for adults and children to combine and match any fractions for learning need. It is accurate and time-saving.

These and other objects, advantages and features of this invention will be apparent from the following description taken with reference to the accompanying drawing, wherein is shown a preferred embodiment of the invention.

DESCRIPTION OF THE PREFERRED EMBODIMENT

Figure 1:
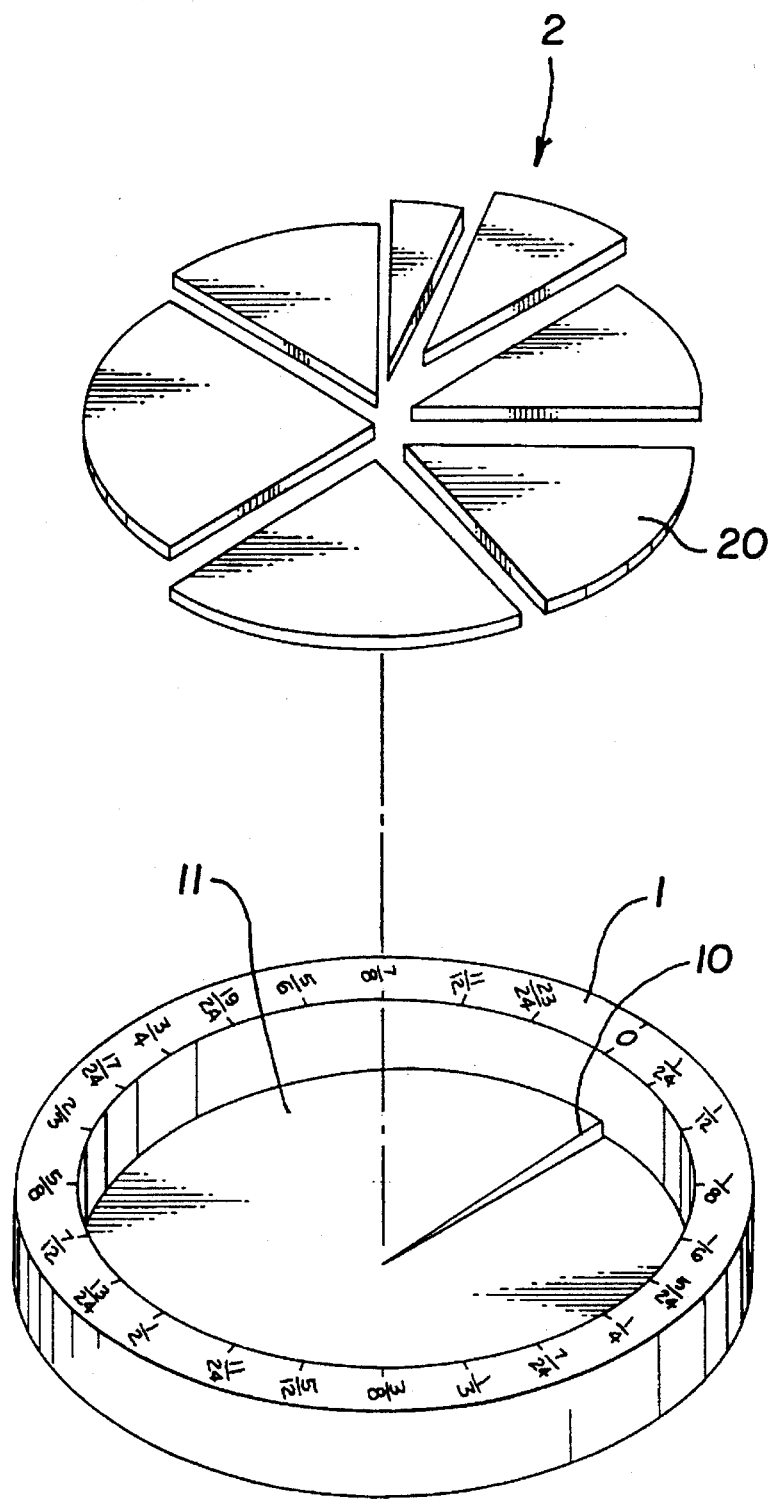
FIG. 1 is an exploded perspective view of a math educational aid according to the present invention.
Figure 3:
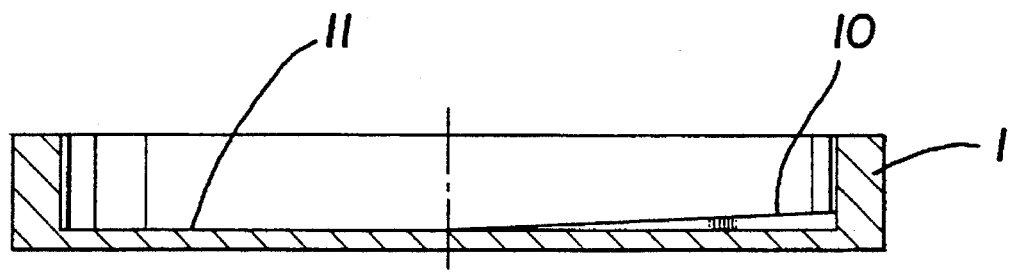
FIG. 3 is an elevational sectional view of the circular holding plate of the math educational aid of FIG. 1.

Referring now to the drawing, and in particular to FIG. 1 and FIG. 3, a circular holding plate 1 has a clockwise spiral bottom 11, designed in such a way that a sloped cliff 10 is formed at the joint of the starting and ending point. The edge of the cliff is lined up with a guiding mark "0" on the elevated wall of fraction scale. The fraction scale, which is on the elevated wall of the holding plate, is marked with 0, $1/24$, $1/12$, $1/8$, $1/6$, $5/24$, $1/4$, $7/24$, $1/3$, $3/8$, $5/12$, $11/24$, $1/2$, $13/24$, $7/12$, $5/8$, $2/3$, $17/24$, $3/4$, $19/24$, $5/6$, $7/8$, $11/12$ and $23/24$, with a difference of $1/24$ between each mark.

Figure 2:
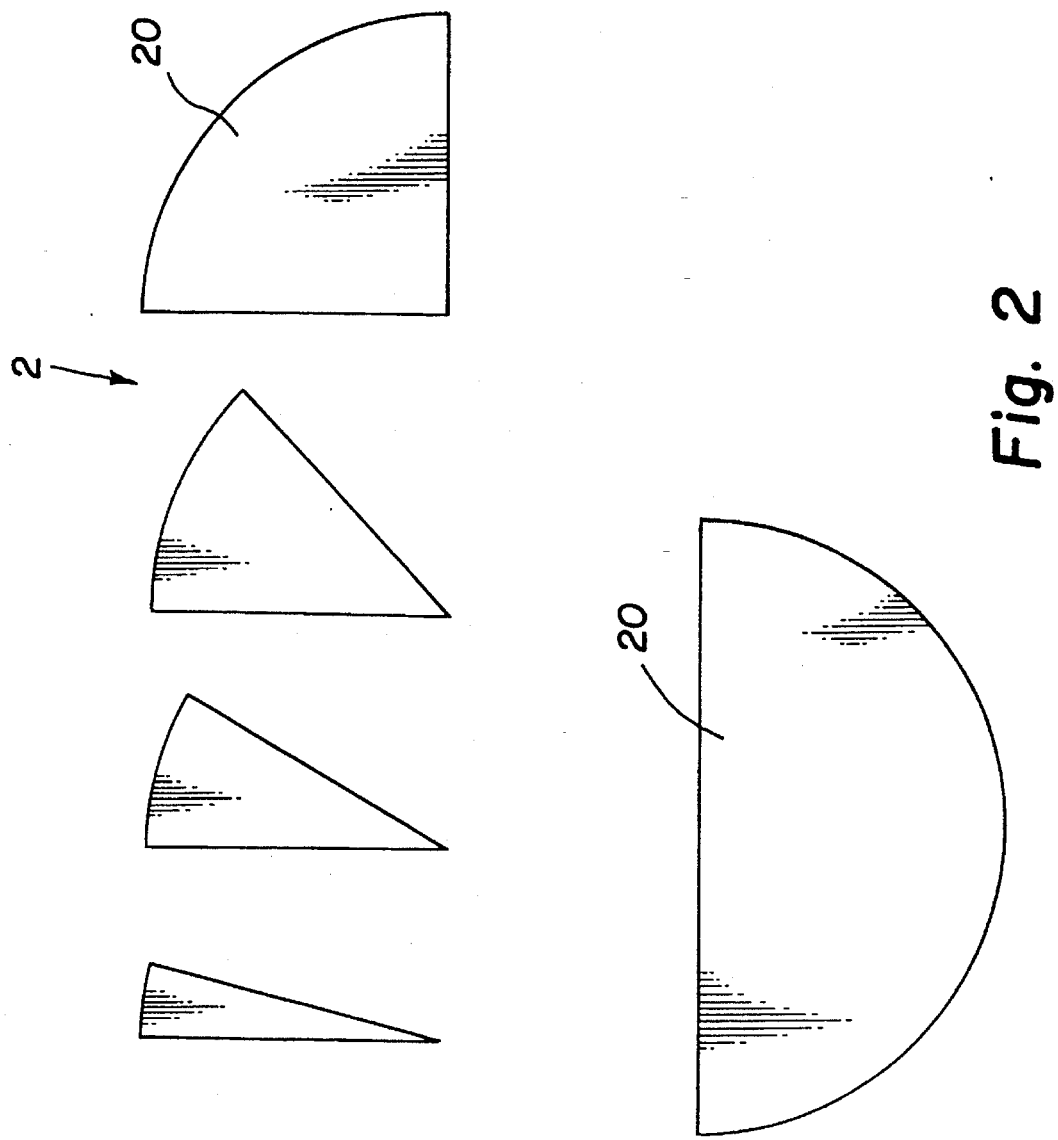
FIG. 2 is a top view of some fraction pieces according to the present invention.
Figure 4:
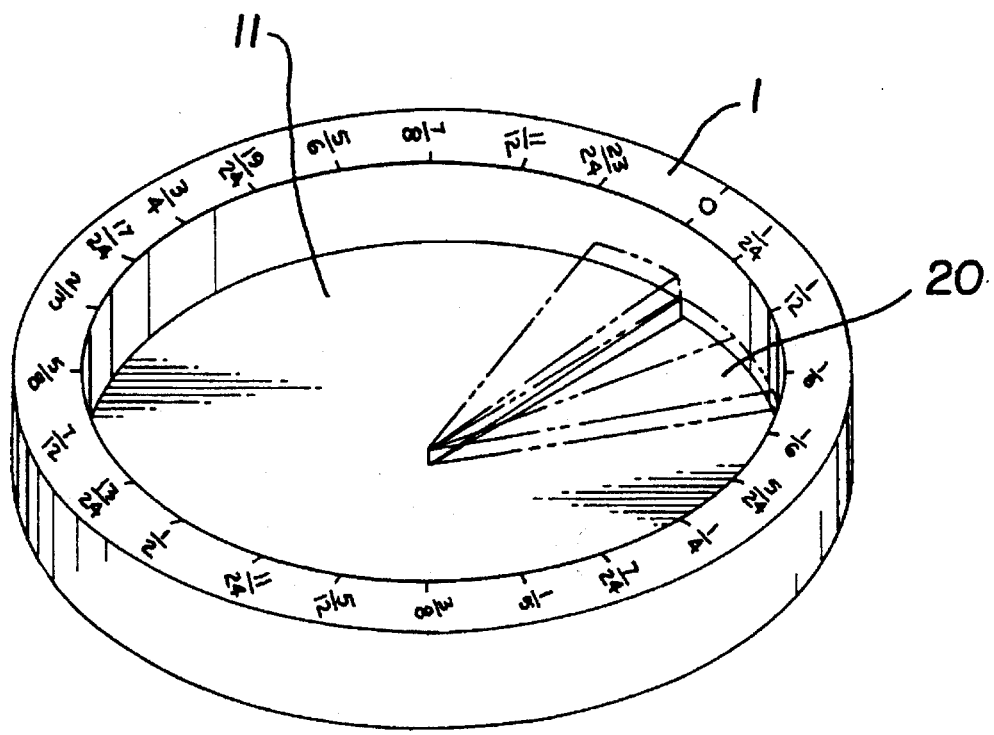
FIG. 4 is a perspective view of the math educational aid of FIG. 1 in use showing the fraction pieces in phantom.

Referring also to FIG. 2 and FIG. 4, the fraction pieces contain numerous pie-shaped segments 20. Any of the segments 20 can precisely depict a fraction, based on the ratio of its center angle to the circle, 360 degrees. With the combination of various fraction pieces, the total of the fractions can be easily identified on the fraction scale. The spiral design and sloped cliff 10 on bottom 11 of the holding plate make it possible for fraction pieces 20 to overlap and, thus, the final result of the fractions may go well over 1, 2, 3 or more.

These fraction pieces as described can depict any fractions based on various center angles, such as 5, 7.5, 10, 30, 45, 60, 90, 180, etc.

The advantages of the present invention include:

1. the capability for the user to combine and match any number of the fraction pieces and the spiral design of the bottom makes it simple and accurate to use.
2. the sloped cliff is lined up with the starting point of the fraction scale, which ensures the user of an accurate starting guide line; the spiral design of the bottom makes it possible for the fraction pieces to overlap and, thus, enables the user to work on fractions over 1.

From the foregoing it will be seen that this invention is well adapted to attain all of the ends and objectives hereinabove set forth, together with other advantages which are inherent to the apparatus.

It will be understood that certain features and sub combinations are of utility and may be employed without reference to other features and sub combinations. This is contemplated by and is within the scope of the claims.

As many possible embodiments may be made of the invention without departing from the scope thereof, it is to be understood that all matter herein set forth or shown in the figures of the accompanying drawings is to be interpreted as illustrative and not in a limiting sense.

I claim:

1. A math educational aid comprising in combination:

a circular helix support surface of approximately 360 degrees, going upward from a start position, forming an abutment at the start position; and a plurality of segments forming at least one angle and capable of resting on the support surface with the point of the angle substantially near the center of the circle of the circular helix, wherein each segment is approximately as thick as the height of the abutment, and wherein if enough segments are placed in abutment to each other on the support surface beginning at the start position to exceed 360 degrees around the circular helix, then that portion of the plurality of segments beyond the 360 degrees, overlapping segments which began with the start position, will rest on the segments which are overlapped.

2. A math educational aid according to claim 1 wherein the plurality of segments form a plurality of sectors of the circle.

3. A math educational aid according to claim 2 further including a marked surface outside of the support surface to indicate progression around the circle.

4. A math educational aid according to claim 3 wherein the marked surface indicates fractions of a complete circle.

5. A math educational aid according to claim 3 wherein the marked surface indicates degrees based on center angle.

* * * * *